United States Patent [19]

Nishikawa et al.

[11] Patent Number: 4,856,382
[45] Date of Patent: Aug. 15, 1989

[54] AUTOMATIC SHIFT TRANSMISSION FOR VEHICLES

[75] Inventors: Masao Nishikawa, Tokyo; Takashi Aoki, Saitama; Yoichi Sato, Saitama; Yukihiro Fukuda, Saitama, all of Japan

[73] Assignee: Honda Giken Kogyo Kabushiki Kaisha, Tokyo, Japan

[21] Appl. No.: 777,566

[22] Filed: Sep. 18, 1985

Related U.S. Application Data

[63] Continuation of Ser. No. 513,248, Jul. 13, 1983.

[30] Foreign Application Priority Data

Jul. 13, 1982 [JP] Japan ................ 57-106582

[51] Int. Cl.[4] ........................................... B60K 41/06
[52] U.S. Cl. ......................................... 74/867; 74/866
[58] Field of Search ............ 74/866, 867, 865, 862; 180/6.3

[56] References Cited

U.S. PATENT DOCUMENTS

| | | | |
|---|---|---|---|
| 3,621,735 | 11/1971 | Lemieux | 74/866 X |
| 3,709,066 | 1/1973 | Burcz | 74/866 |
| 3,744,347 | 7/1973 | Kubo et al. | 74/866 |
| 3,750,495 | 8/1973 | Ito et al. | 74/866 |
| 3,885,388 | 5/1975 | Crull | 180/6.3 X |
| 3,903,759 | 9/1975 | Hashimoto | 74/866 |
| 3,922,933 | 12/1975 | Sakai et al. | 74/866 |
| 3,937,105 | 2/1976 | Arai et al. | 74/866 X |
| 4,068,543 | 1/1978 | Sakai et al. | 74/866 |
| 4,346,627 | 8/1982 | Kawamoto et al. | 74/866 X |
| 4,367,528 | 1/1983 | Kawamoto et al. | 74/866 X |
| 4,393,732 | 7/1983 | Suzuki et al. | 74/866 |
| 4,466,311 | 8/1984 | Hiramatsu | 74/866 |
| 4,476,746 | 10/1984 | Miki et al. | 74/866 X |
| 4,502,354 | 3/1985 | Suzuki et al. | 74/866 |

Primary Examiner—Dwight G. Diehl
Attorney, Agent, or Firm—Armstrong, Nikaido, Marmelstein, Kubovcik & Murray

[57] ABSTRACT

An automatic shift transmission for vehicles of the type in which the shifting of speed is automatically effected with a changeover valve having an orifice installed upstream thereof and a pilot type solenoid valve installed downstream thereof.

A pressure reducing valve is provided upstream of the orifice.

The amount of hydraulic oil consumed through the solenoid valve is possibly reduced.

6 Claims, 3 Drawing Sheets

AUTOMATIC SHIFT TRANSMISSION FOR VEHICLES

This application is a continuation of application Ser. No. 513,248 filed July 13, 1983.

BACKGROUND OF THE INVENTION

1. Field of the Invention

The present invention relates to an automatic shift transmission for vehicles. Particularly, it relates to an automatic shift transmission for vehicles of the type in which the shifting of speed is effected with a changeover valve operable with a pilot type solenoid valve connected to a vent line.

2. Description of Relevant Art

Conventionally, in automatic shift transmissions of the type in which the shifting of speed is effected with at least one changeover valve adapted for the selective supply of hydraulic oil to a plurality of speed shift clutches and in which, as directly operated with the solenoid valve, the changeover valve for controlling the selection of gear ratio needs a relatively large electric current to be conducted through the solenoid valve, thus increasing the heat liberation, there has been employed a relatively small solenoid valve of a poppet type as a pilot valve for the changeover valve.

For operating a changeover valve of a spool type with such a poppet type pilot valve, there have been proposed automatic shift transmissions for vehicles in which the spool valve is normally biassed at its either end with a spring so as to be held at its first changeover position and supplied at the other end with a hydraulic pressure introduced thereto from a hydraulic shift line through an orifice so as to move against the resilient force of the spring to its second changeover position and in which, by opening and closing the poppet valve installed downstream of the orifice, the changeover valve is changed over between the first and second changeover positions.

In those conventional automatic shift transmissions, however, upstream of the orifice there is always existing a line pressure, which may be extremely raised with a high load, thus causing the pilot valve as opened to vent throught the orifice a considerable amount of hydraulic oil, with the result of poor economy.

Moreover, even in a cruising in which the line pressure is controlled at a constant level without being raised, the pressure for changing over the spool valve is not needed to be so high as the line pressure and, therefore, also with respect to the amount of hydraulic oil vented through the orifice in this case, it has been an object for automatic shift transmissions to possibly reduce the oil consumption.

The present invention has been achieved to effectively solve such problem in the conventional automatic shift transmissions for vehicles.

SUMMARY OF THE INVENTION

According to the present invention there is proposed, in an automatic shift transmission for vehicles including at least one changeover valve adapted for automatically effecting the speed shift, an orifice installed upstream of the changeover valve and a pilot type solenoid valve installed downstream of the changeover valve, the changeover valve being operable with the open-close action of the solenoid valve, an improvement comprising a pressure reducing valve installed upstream of the orifice.

Another of the present invention is to provide, in an automatic shift transmission in which the shifting of speed is effected with a changeover valve operable with a pilot type solenoide valve, an improvement for possibly reducing the amount of hydraulic oil vented through the solenoid valve, thus permitting the transmission size to be minimized.

The above and further features, objects and advantages of the present invention will more fully appear from the following detailed description of the preferred embodiment of the invention when the same is read in conjunction with the accompanying drawings.

BRIEF DESCRIPTION OF THE ACCOMPANYING DRAWINGS

DETAILED DESCRIPTION OF THE PREFERRED EMBODIMENT

Figure 1:
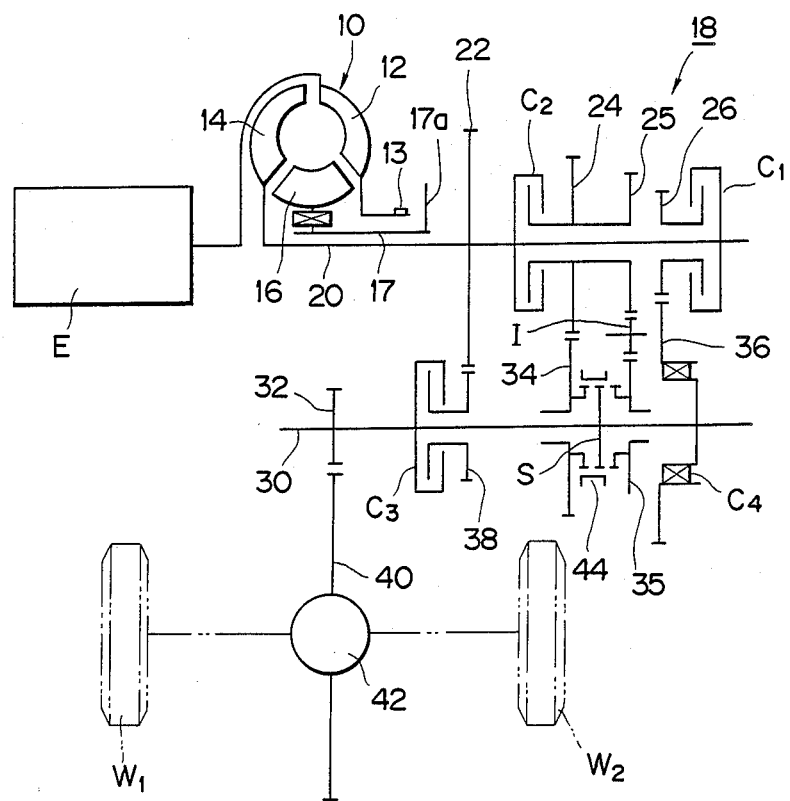
FIG. 1 is a basic transmission system chart of a vehicle including an automatic shift transmission according to a preferred embodiment of the invention.

Referring first to FIG. 1, designated at reference character E is an engine, of which output is transmitted to a pump impeller 12 of a hydraulic torque converter 10 and hydrodynamically to a turbine 14. The pump impeller 12 drives at the right end 13 thereof a hydraulic pump 50 shown in FIG. 2. As well known, at the torque converter 10, the amplification of torque has its reaction borne by a stator 16. When the reaction becomes excessive relative to a predetermined value, the stator 16 will have a stator shaft 17 rotate, pushing at its distal end arm 17a a regular valve 54 shown in FIG. 2, thereby raising the line pressure.

The torque converter 10 is provided with an output shaft 20 employed simultaneously as an input shaft of an auxiliary shift gearing 18, the input shaft 20 having in order from the left of FIG. 1 a third speed drive gear 22, a second speed clutch C2 and a first speed clutch C1 assembled integrally therewith. The input shaft 20 is further provided with a second speed gear 24 and a first speed gear 26 loose-fitted thereon so as to be rotatable integrally therewith when the clutches C1, C2 are brought in engagement, respectively, the second speed drive gear 24 being integrally provided with a reverse drive gear 25.

In parallel with the input shaft 20, there is disposed a counter shaft 30 having fixed thereto in order from the left of FIG. 1 a final drive gear 32, a third speed clutch C3, a spline S selectively engageable with a second speed driven gear 34 and a reverse driven gear 35, and a first speed driven gear 36. Between the first speed driven gear 36 and the counter shaft 30, there is interposed a one-way clutch C4 for transmitting the torque from the engine E in the driving direction only.

The counter shaft 30 has thereon a third speed driven gear 38, a second speed driven gear 34 and a reverse driven gear 35 loose-fitted to be rotatable relative to one another, the third speed driven gear 38 being arranged to be integrally rotatable with the third speed clutch C3 as brought in engagement therewith. The reverse gears 25 and 35 are engaged with each other through an idle gear I put therebetween.

The torque of the final drive gear 32 is transmitted to a final driven gear 40 for driving, through a differential gear 42 combined to be integral therewith, left and right front wheels W1, W2. When entering a reverse mode, a selector sleeve 44 on the counter shaft 30 will be shifted to the right in FIG. 1 with a shift fork (not shown) thereby to engage the counter shaft 30 with the reverse gear 35 and the clutch C2 will be brought in engagement for the transmission of reverse torque.

Figure 2:
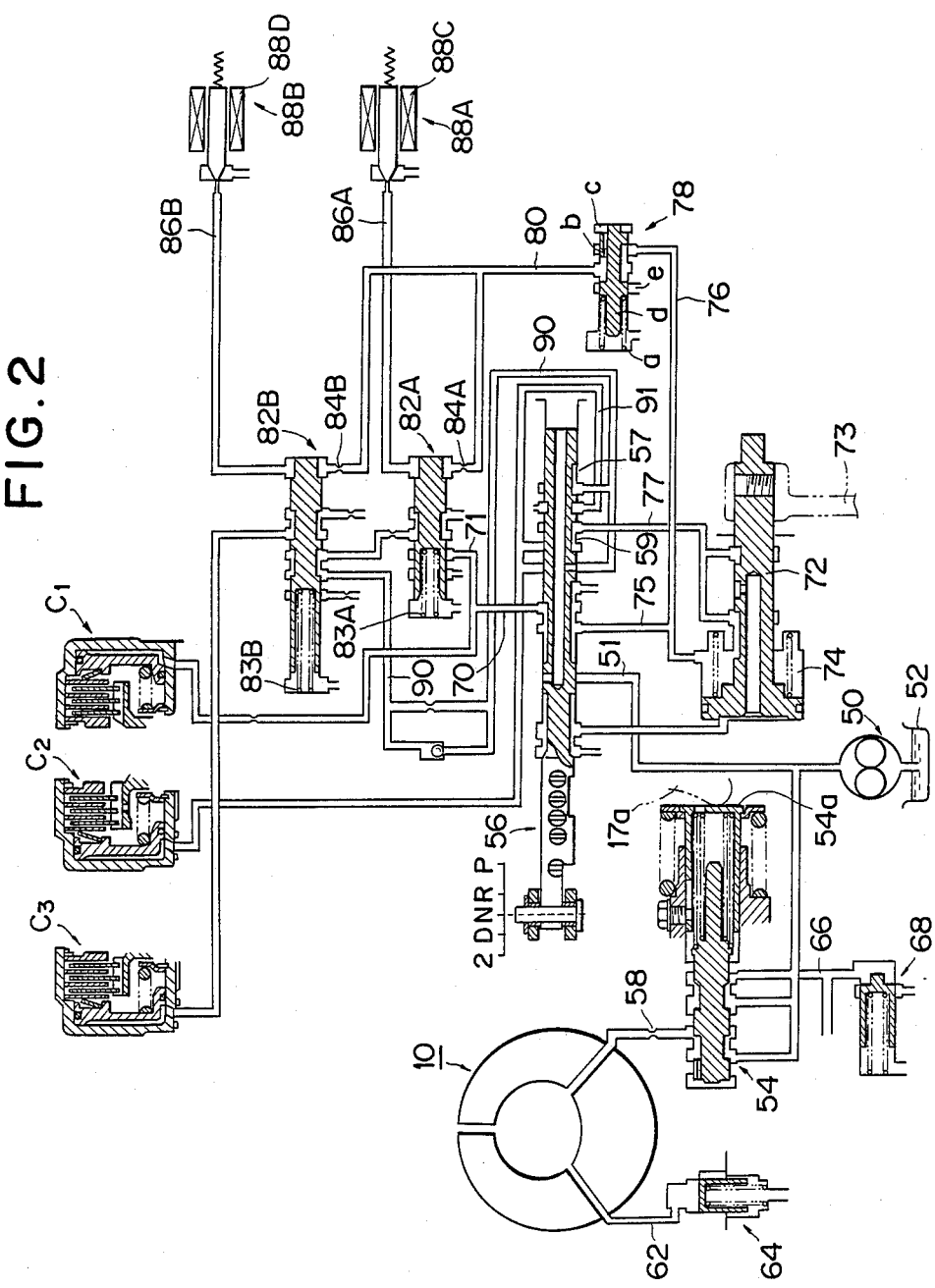
FIG. 2 is an hydraulic circuit diagram of the automatic shift transmission of FIG. 1.

Referring now to FIG. 2, the hydraulic pump 50 is driven by the pump impeller 12 as before mentioned to pump up hydraulic oil of an oil tank 52, thereby for sending same, while controlling the pressure by means of a regulator valve 54, to a hand valve 56. The regulator valve 54 has a spring seat 54a abutted with the stator arm 17a extending from the stator shaft 17. When the reaction applied to the stator 16 exceeds a set value or in other words in case the torque converter 10 has its torque amplification factor raised above a reference level, the stator arm 17a will push the spring seat 54a thereby to raise the delivery pressure of the pump 50 in proportion to the torque amplification factor.

When the hand valve 56 is in a neutral position N as shown in FIG. 2, the hydraulic oil sent to this valve 56 will be interrupted here.

When the valve 56 is shifted by one step from the above mentioned position to the left in FIG. 2 to an advance position D, hydraulic fluid line or passage 51 extending from the pump 50 will be connected to hydraulic fluid line or passage 70 communicating with the clutch C1 and to a spring chamber 74 of a hydraulic servo-element 72 adapted for the actuation of the selector sleeve 44. Accordingly, in this state, there is established a first speed gear ratio, while the servo-element 72 is staying in the left-moved position as shown in FIG. 2, thus holding the sleeve 44 at the position shown in FIG. 1 by means of a shift fork 73 and thereby keeping the reverse gear train in an unoperable condition.

The spring chamber 74 has its oil pressure lead through hydraulic fluid line or passage 76 to a pressure reducing valve 78, which valve 78 outputs, even when the pressure in hydraulic fluid line or passage 76 is varied, a preset relatively low pressure and is enabled, in the event where a leakage takes place downstream thereof, to minimize the leakage, thus permitting the pump 50 to be small-sized.

The pressure reducing valve 78 has a valve body d held with a spring a so as to permit hydraulic fluid line 76 to normally communicate with hydraulic fluid line 80. The line pressure in hydraulic fluid line 76 is supplied through an orifice b to an oil chamber c and, as raised, will cause the valve body d to move leftwards in FIG. 2, thus interupting the communication between hydraulic fluid lines 76 and 80, while permitting hydraulic fluid line 76 to communicate with return line e. The output of the pressure reducing valve 78 is introduced through orifices 84A and 84B to right end chambers of a first-second shift valve 82A and a second-third shift valve 82B, respectively. The right end chambers of the two shift valves 82A, 82B are in communication through hydraulic fluid lines or passages 86A, 86B with the tank 52, respectively, the return lines 86A, 86B being closable as well as openable with corresponding pilot type solenoid valves 88A, 88B installed therein, respectively. The shift valves 82A, 82B are normally biassed rightwards in FIG. 2 with springs 83A, 83B provided in their left end chambers, respectively, while being caused to move leftwards with oil pressures in the corresponding right end chambers.

When the first-second shift valve 82A is in the left-moved position and the second-third shift valve 82B is in the right-moved position with the solenoid valves 88A, 88B closed and opened, respectively, hydraulic fluid line 71 communicating with hydraulic fluid line 70 will communicate through the second-third shift valve 82B with hydraulic fluid line 90 connected through the hand valve 56 to hydraulic fluid line 91 applying its oil pressure to the second speed clutch C2, which then becomes engaged, thus establishing a second speed gear ratio by the effect of the one-way clutch C4 provided as shown in FIG. 1 for the first speed clutch C1 which is still applied with oil pressure.

Thereafter, when also the solenoid valve 88B is closed and accordingly, while the first-second shift valve 82A is staying in the left-moved position, also the second-third shift valve 83A is moved leftwards, hydraulic fluid line 71 as a branch of hydraulic fluid line 70 will be connected through the two shift valves 82A, 82B to the third speed clutch C3 and concurrently hydraulic fluid line 90 is connected to the tank 52, thus releasing the second speed clutch C2 from the engagement and thereby establishing a third speed gear ratio.

In the above embodiment, the open-close action of the solenoid valves 88A, 88B is effected by energizing and deenergizing their solenoids 88C, 88D with an electric signal.

The foregoing functional description concerned with the solenoid valves 88A, 88B is given to the state in which the hand valve 56 is in the position D. Under those conditions where the hand valve 56 is out of the position D, desired power trains will be established by no more than shifting the hand valve 56, irrespective of the working state of the solenoid valves 88A, 88B.

With the hand valve 56 in the position D, hydraulic oil is partially consumed to be vented through at least either of the solenoid valves 88A, 88B as opened as a pilot valve. The amount of this vented oil depends on the effective open area of or the pressure difference across the orifice(s) 84A and/or 84B. In this embodiment, the pressure reducing valve 78 reduces oil pressure to a preset level before supplying to the orifices 84A, 84B, thereby possibly minimizing the amount of vented oil or oil leak and thus being economical.

Figure 3:
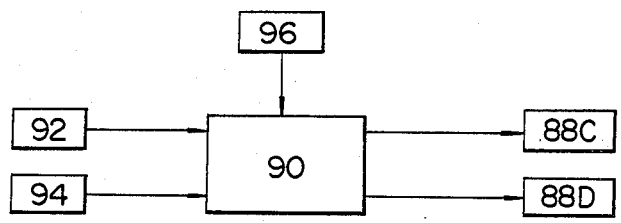
FIG. 3 is a block diagram of an electric circuit for operating solenoid valves in the hydraulic circuit of FIG. 2.
Figure 4:
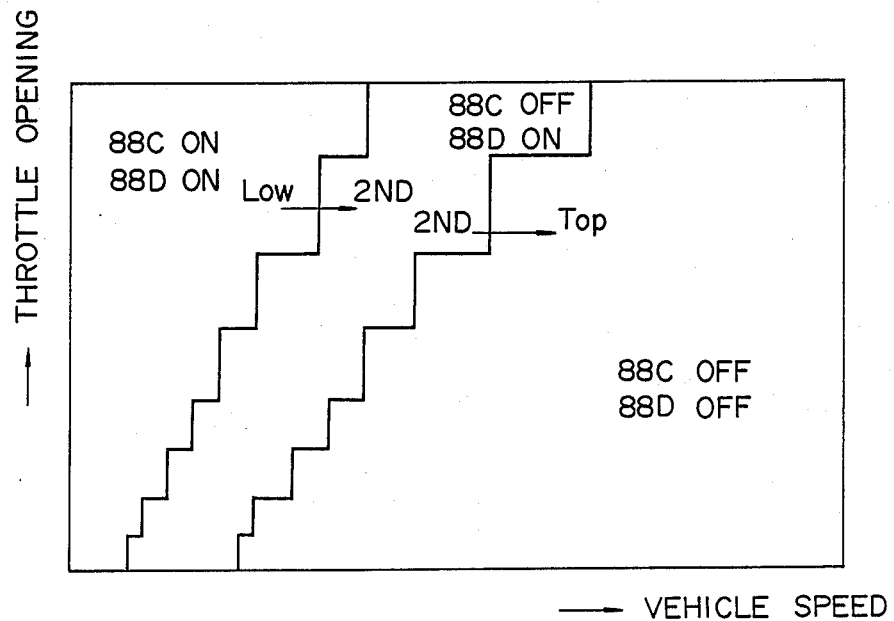
FIG. 4 is a speed shift map for the automatic shift transmission of FIG. 2, showing a working range of the solenoid valves of FIG. 3.

Referring now to FIGS. 3 and 4, designated at reference character 90 is an electronic circuit for energizing and deenergizing the solenoids 88C, 88D. The electronic circuit 90 receives a vehicle speed signal 92 from a vehicle speed sensor (not shown), an opening signal 94 of a fuel feeding throttle valve (not shown) and a position signal 96 of a speed shift lever (not shown) and, only when the level of this lever position signal 96 is high, compares the remaining two output signals 92, 94 with their preset reference levels to provide electric signals for the solenoids 88C, 88D. Each time when the reference levels are exceeded, the solenoids 88C, 88D will be energized in accordance with a shift schedule map shown in FIG. 4.

We claim:

1. In an automatic shift hydraulic transmission for vehicles including a hydraulic fluid line, at least one hydraulically actuated changeover valve in said fluid line for automatically effecting a speed shift, an orifice in said hydraulic fluid line upstream of said changeover valve and a pilot type solenoid valve in said fluid line downstream of said changeover valve, said solenoid valve having open-close action, said changeover valve being operable with the open-close action of said solenoid valve, an improvement comprising: a pressure reducing valve means in said fluid line immediately upstream of said orifice for outputting to said orifice actuating hydraulic fluid at a preset pressure lower than the fluid pressure supply to said pressure reducing valve.

2. An automatic shift transmission according to claim 1, wherein: said pressure reducing valve means comprises a slidable valve body having an opening direction and a closing direction, a spring normally biassing said valve body in the opening direction thereof and a hydraulic chamber for pushing said valve body in the closing direction thereof against said spring; and said hydraulic chamber has a pressure introduced therein from upstream of said pressure reducing valve.

3. An automatic shift transmission according to claim 1, further including a shift lever having a plurality of positions, wherein: said solenoid valve is openable and closable in response to an electric signal according to a position of said shift lever.

4. An automatic shift transmission according to claim 3, further including a vehicle speed sensor for detecting the vehicle speed and having an output signal and a throttle valve for feeding fuel when said valve is open, wherein: said electric signal comprises a function of an output signal of said vehicle speed sensor and a signal according to a degree of opening of said throttle valve.

5. In an automatic shift hydraulic transmission for vehicles including a hydralic fluid line, a plurality of hydraulically actuated changeover valves in said fluid line each adapted for automatically effecting a speed shift, an orifice in said fluid line to each of said changeover valves upstream of each of said changeover valves and a pilot type solenoid valve for each of said plurality of changeover valves in said fluid line downstream of each of said changeover valves, each said pilot type solenoid valve having open-close action, said changeover valves being selectively operable with the open-close action of said solenoid valve installed downstream thereof, an improvement comprising: a pressure reducing valve means in said fluid line immediately upstream of said orifices for outputting to each of said orifices actuating hydraulic fluid at a preset pressure lower than the fluid pressure supplied to said pressure reducing valve.

6. In an automatic shift hydraulic transmission for vehicles having a hydraulic fluid line, a regulator valve for controlling line pressure and including at least one hydraulically actuated changeover valve for automatically effecting a speed shift, an orifice in said fluid line upstream of said changeover valve and a pilot type solenoid valve in said fluid line downstream of said changeover valve and having open-close action, said changeover valve being operable with the open-close action of said solenoid valve, an improvement comprising: a pressure reducing valve means in said fluid line immediately upstream of said orifice for outputting to said orifice actuating hydraulic fluid at a preset pressure lower than said line pressure.

* * * * *